(12) United States Patent
Bokämper et al.

(10) Patent No.: US 6,257,085 B1
(45) Date of Patent: Jul. 10, 2001

(54) ELECTROMOTIVE DRIVE MECHANISM FOR A BODY OF FURNITURE

(75) Inventors: Ralf Bokämper, Lübbecke; Andreas Roither, Bielefeld, both of (DE)

(73) Assignee: Dewert Antriebs- und Systemtechnik GmbH & Co. KG, Kirchlengern (DE)

( * ) Notice: Subject to any disclaimer, the term of this patent is extended or adjusted under 35 U.S.C. 154(b) by 0 days.

(21) Appl. No.: 09/412,492

(22) Filed: Oct. 5, 1999

(30) Foreign Application Priority Data

Oct. 12, 1998 (DE) .......................................... 298 18 204 U

(51) Int. Cl.⁷ ................................ F16H 1/16; F16C 33/02
(52) U.S. Cl. ................................. 74/425; 188/83; 384/125
(58) Field of Search .................................. 74/89.14, 425; 188/83; 384/125, 148

(56) References Cited

U.S. PATENT DOCUMENTS

| 3,431,033 | * | 3/1969 | Dangauthier | 384/125 |
| 4,040,307 | * | 8/1977 | Koster | 74/425 |
| 4,885,948 | * | 12/1989 | Thrasher, Jr. et al. | 74/89.14 |
| 4,900,960 | * | 2/1990 | Becker et al. | 74/425 X |

* cited by examiner

*Primary Examiner*—Allan D. Herrmann
(74) *Attorney, Agent, or Firm*—Henry M. Feiereisen

(57) ABSTRACT

An electromotive drive mechanism for a body of furniture, includes a worm drive which is activated by a motor and includes a worm received in the casing and a worm wheel in engagement with the worm. Received in the casing is a support body which is closely fitted around the worm and includes a receiving opening for engagement by the worm wheel.

14 Claims, 1 Drawing Sheet

ELECTROMOTIVE DRIVE MECHANISM FOR A BODY OF FURNITURE

CROSS-REFERENCES TO RELATED APPLICATIONS

This application claims the priority of German Patent Application Serial No. 298 18 204.1, filed Oct. 12, 1998, the subject matter of which is incorporated herein by reference.

BACKGROUND OF THE INVENTION

The present invention relates, in general, to an electromotive drive mechanism for a body of furniture, and in particular to a drive mechanism of a type having a worm gear activated by a motor and essentially including a gearbox casing for housing a worm and a worm wheel which is in mesh with the worm.

The type of electromotive drive, involved here, is applicable for a wide variety of different articles of furniture, for example beds, slatted bed frames or the like and is considered a small power drive. Typical drive mechanisms of this type for operating a body of furniture include a worm which is either fitted in fixed rotative engagement onto the output journal of an electric motor, or forms the output journal itself to reduce the overall dimensions. As a consequence of the geometry of the worm and the worm wheel, relatively high gearing forces are encountered that may lead to a flexure of the output journal when subject to respectively high loads. Thus, the diminished contact ratio between the worm and the worm wheel results in increased wear. In particular, the flanks of the worm wheel wear off, leading to a fracture of the output journal, so that the drive must be repaired or replaced by a new drive.

SUMMARY OF THE INVENTION

It is thus an object of the present invention to provide an improved electromotive drive mechanism, obviating the afore-stated drawbacks.

In particular, it is an object of the present invention to provide an improved electromotive drive mechanism which is simple in structure and yet at least significantly reduces a flexure of the output journal of the motor or of the wormshaft.

These objects, and others which will become apparent hereinafter, are attained in accordance with the present invention by providing a support body which is so insertable in the gearbox casing as to closely fit around the worm and includes a receiving opening for engagement by the worm wheel.

The support body is made of suitable material to keep friction to a minimum, e.g. from plastic material through an injection molding process. Through the provision of a support body according to the present invention, a sagging or flexure of the wormshaft or output journal can reliably be prevented. Thus, the worm is in optimum fit with the flanks of the worm wheel so that wear is significantly reduced. The provision of the receiving opening enables an engagement of the worm windings with the gears of the worm wheel.

According to another aspect of the present invention, the support body has a basic form of cylindrical configuration and is inserted in positive and/or non-positive engagement in a bore of the gearbox casing. Drives for articles of furniture have to be designed for realizing a self-locking action so that the attached piece of furniture is able to remain in any position, once the drive is shut down. Normally, the drive includes a spindle for driving the worm wheel, with the spindle having mounted thereon a spindle nut. In the event, the spindle is not constructed for self-locking action, but such action is desired, it is proposed, in accordance with another feature of the present invention, to provide the motor-facing end portion of the support body with several slots to realize deformable tongues. This end portion is suitably formed with an outer groove for accommodation of an annular spring retainer, whereby the spring retainer applies a precisely defined, constant friction force on the output journal of the motor to thereby effect a self-locking action of the drive mechanism, when the drive per se is not designed to include a self-locking mechanism.

The drive mechanism according to the present invention is especially suitable for articles of furniture, which require a relatively small torque for adjustment.

BRIEF DESCRIPTION OF THE DRAWING

The above and other objects, features and advantages of the present invention will now be described in more detail with reference to the accompanying drawing, in which the sole

DETAILED DESCRIPTION OF PREFERRED EMBODIMENTS

Figure 1:
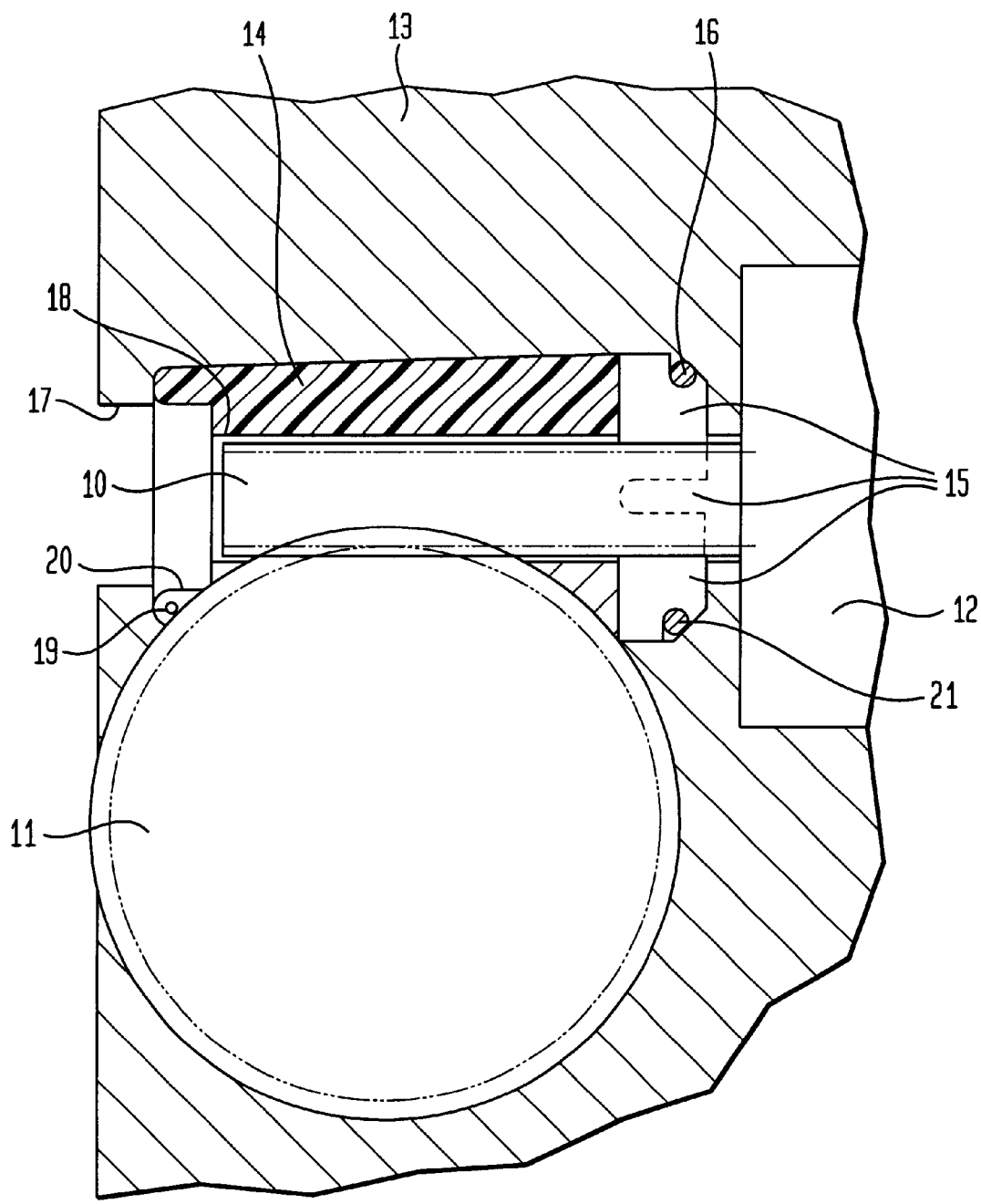
FIG. 1 shows a sectional view of a worm drive for a drive mechanism for a body of furniture, in accordance with the present invention.

Turning now to FIG. 1, there is shown a worm drive for a drive mechanism, useful for height adjustment of an article of furniture (not shown). For the sake of simplicity, the drive mechanism will be described hereinafter only in connection with those parts that are necessary for the understanding of the present invention. Thus, it will be appreciated by persons skilled in the art that the drive mechanism must contain much mechanical apparatus which does not appear in the foregoing Figures and will not be described in detail, as this apparatus does not form part of the present invention.

The worm drive includes a worm 10 which is driven by a motor, for example a fan motor, via a worm wheel 11. In the non-limiting example of FIG. 1, the worm 10 forms the output journal of the motor 12; However, it is certainly conceivable to place the worm onto a separate output journal. The worm 10 and the worm wheel 11 are destined for accommodation in a gearbox casing 13 which is formed with a bore 17. Fitted in the bore 17 in positive and/or non-positive engagement is a cylindrical support body 14 which has a bore 18 for receiving the worm 10. The bore 18 is of such dimensions that the support body 14 closely fits around the worm 10. The support body 14 is further formed with a slotted receiving opening 19 for passage of the worm wheel 11 and engagement with the worm 10.

The support body 14 has a motor-distal end, which is formed with a recess 20, and a motor-proximal end portion, which is formed with several, for example four, inwardly directed longitudinal slots 15 to form resilient tongues to impart the motor-proximal end portion of the support body 14 with a certain flexibility. The slots 15 are suitably offset to one another at an angle of 90°. At a slight distance to the end face of the motor-proximal end portion, the support body 14 is formed with an outer circumferential groove 21 for receiving an annular spring 16 which applies a constant friction force, determined by the spring 16, onto a confronting smooth area of the motor shaft or output journal, so as to effect a self-locking action of the drive mechanism.

As further shown in FIG. 1, the support body 14 has an outer contour of conical configuration, with the greatest diameter of the cone facing the motor 12, so as to realize a particular tight fit of the support body 14 in the gearbox casing 13.

While the invention has been illustrated and described as embodied in an electromotive drive mechanism for a body of furniture, it is not intended to be limited to the details shown since various modifications and structural changes may be made without departing in any way from the spirit of the present invention.

What is claimed as new and desired to be protected by letters patent is set forth in the appended claims:

What is claimed is:

1. An electromotive drive mechanism for a body of furniture, comprising:
   a worm drive activated by a motor and generally including a casing, a worm received in the casing and a worm wheel in mesh with the worm; and
   a support body so received in the casing as to closely fit around the worm and including a receiving opening for engagement by the worm wheel.

2. The drive mechanism of claim 1 wherein the support body has a basic form of cylindrical configuration, said casing having a bore for receiving the support body in at least one of a positive engagement and a non-positive engagement.

3. The drive mechanism of claim 1 wherein the support body has an outer conical configuration, with a greatest diameter facing the motor.

4. The drive mechanism of claim 1 wherein the support body has a motor-proximal end portion formed with a plurality of longitudinal slots and an outer circumferential groove, and further comprising an annular spring received in the groove.

5. The drive mechanism of claim 1 wherein the support body is made of plastic material through an injection molding process.

6. The drive mechanism of claim 1 wherein the receiving opening has a slotted configuration.

7. The drive mechanism of claim 4 wherein the slots are offset to one another at an angle of 90°.

8. An electromotive drive mechanism for a body of furniture, comprising:
   a worm drive activated by a motor and generally including a casing, a worm received in the casing and a worm wheel in mesh with the worm;
   a support body so received in the casing as to closely fit around the worm and including a receiving opening for engagement by the worm wheel, said support body having a motor-proximal end portion formed with a plurality of longitudinal slots and an outer circumferential groove; and
   an annular spring received in the groove.

9. The drive mechanism of claim 8 wherein the support body has a basic form of cylindrical configuration, said casing having a bore for receiving the support body in at least one of a positive engagement and a non-positive engagement.

10. The drive mechanism of claim 8 wherein the support body has an outer conical configuration, with a greatest diameter facing the motor.

11. The drive mechanism of claim 8 wherein the support body is made of a material suitable to reduce friction.

12. The drive mechanism of claim 8 wherein the support body is made of plastic material through an injection molding process.

13. The drive mechanism of claim 8 wherein the receiving opening has a slotted configuration.

14. The drive mechanism of claim 8 wherein the slots are offset to one another at an angle of 90°.

* * * * *